United States Patent [19]

Jackson

[11] Patent Number: 4,566,617

[45] Date of Patent: Jan. 28, 1986

[54] SEAT PACK ASSEMBLY

[76] Inventor: W. Shaun Jackson, 2860 Tessmer Rd., Ann Arbor, Mich. 48103

[21] Appl. No.: 630,856

[22] Filed: Jul. 13, 1984

[51] Int. Cl.⁴ .............................. B60R 7/00; B62J 7/00
[52] U.S. Cl. ................................. 224/275; 224/32 R; 224/39
[58] Field of Search .................. 224/275, 30 R, 32 R, 224/39, 42, 45 R

[56] References Cited

U.S. PATENT DOCUMENTS

| | | | |
|---|---|---|---|
| 591,904 | 10/1897 | Weber | 224/30 R |
| 2,965,344 | 12/1960 | Baker | 224/42.45 R X |
| 3,172,584 | 3/1965 | Cohen | 224/42.45 R |
| 4,415,105 | 11/1983 | Jackson | 224/39 X |

FOREIGN PATENT DOCUMENTS

| | | | |
|---|---|---|---|
| 87303 | 1/1958 | Netherlands | 224/39 |
| 848565 | 9/1960 | United Kingdom | 224/30 R |

Primary Examiner—Stephen Marcus
Assistant Examiner—Robert Petrik
Attorney, Agent, or Firm—Krass and Young

[57] ABSTRACT

A seat pack assembly adapted to be supported underneath the seat of a bicycle and including a fabric pack, a wire mounting bracket carried by the pack and a tubular U-shaped mounting bracket adapted to be mounted beneath the bicycle seat. The pack bracket comprises an elongated resilient wire serpentinely configured to define a pair of parallel elongated forwardly extending finger portions at its opposite ends and an intermediate bight portion extending outwardly from the rearward ends of the finger portions and then forwardly to form a pack frame. To mount the wire bracket to the pack, the finger portions are grasped and squeezed together to reduce the maximum diameter of the bight portion and allow the bight portion to be inserted into the rear end of a pocket formed in the top of the pack, whereafter the finger portions may be released to allow the bight portion to expand and fill the pocket to provide an upper perimeter frame for the pack while the finger portions extend forwardly above the pack, outside of the pocket, for coaction with the U-shaped mounting bracket mounted beneath the bicycle seat.

11 Claims, 3 Drawing Figures

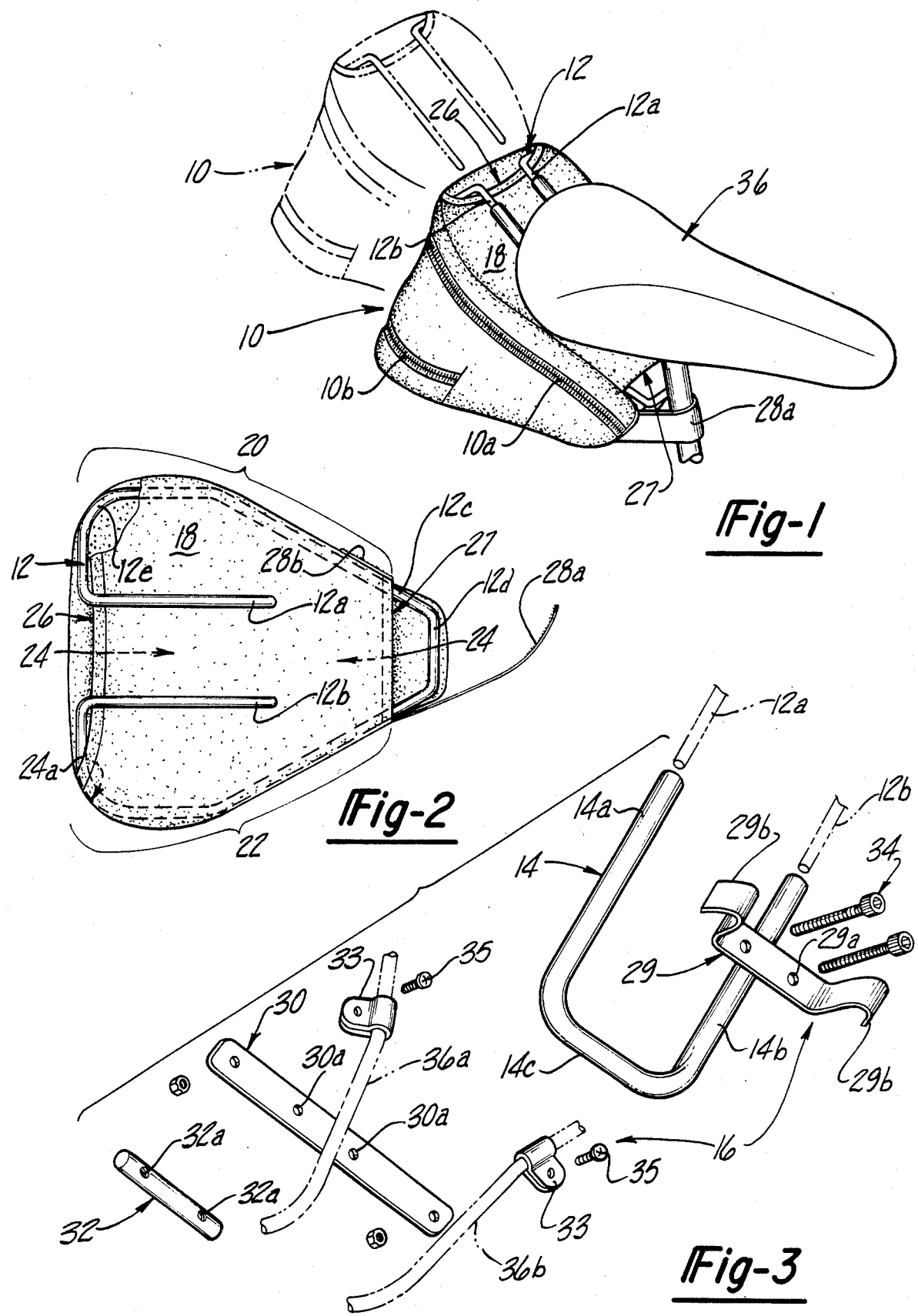

SEAT PACK ASSEMBLY

BACKGROUND OF THE INVENTION

This invention relates to accessory bags or packs adapted to be supported on a bicycle or motorcycle and, more particularly, to an accessory pack adapted to be removably supported beneath the seat of a bicycle.

A pack carried beneath a seat of a bicycle provides a convenient means for carrying small portable articles. Such packs are commonly constructed of a flexible fabric or sheet material providing light weight and low cost.

Packs constructed in this manner however are susceptible to being distended or disoriented by their contents if they are not firmly mounted. For example, when the pack is secured to the seat with a pair of conventional buckle straps, the pack tends to move in disturbing ways, either under its own weight or in response to the cycle hitting a bump. Various attachment assemblies have been proposed to provide a more firm means of securing the pack to the underside of the seat. Whereas these attachment assemblies have had limited success, they have tended to be unduly complicated and/or have tended to lose their supporting capacity with use.

BRIEF SUMMARY OF THE INVENTION

The present invention provides a simple and inexpensive seat pack assembly which is readily mounted and dismounted to the seat and which provides rigid support for the pack over extended periods of use and even under conditions of harsh or heavy usage.

According to one feature of the invention, the pack is supported beneath the seat by a pair of coacting mounting brackets, one of which is secured to the rear underside portion of the seat and the other of which is releasably secured to the pack. One of the brackets defines an elongated tubular portion and the other bracket defines an elongated finger portion. The pack is installed beneath the seat simply by moving the pack forwardly to insert the elongated finger portion into the elongated tubular portion.

According to a further feature of the invention, the mounting bracket secured beneath the seat defines the elongated tubular portion and the mounting bracket releasably secured to the pack defines the elongated finger portion.

According to a further feature of the invention, the bracket positioned beneath the seat defines a pair of parallel, elongated tubular portions and the bracket secured to the pack defines a pair of parallel elongated finger portions which are respectively telescopically received in the tubular portions of the seat mounted bracket.

According to a further feature of the invention, the mounting bracket releasably secured to the pack comprises a bent rod or wire which is configured to provide the parallel elongated finger portions at its opposite ends and is configured intermediate its ends to define a loop or bight portion which extends forwardly from the rear ends of the finger portions and is adapted to be releasably received in a pocket defined on the top of the pack.

According to a further feature of the invention, the maximum width of the bight portion of the wire bracket is greater than the width of the opening to the pack pocket and the bracket is formed of a resilient material so that the parallel finger portions may be squeezed together to reduce the maximum width of the bight portion to a dimension less than the width of the opening to the pocket so that the bight portion may be slid into the pocket, whereafter the finger portions may be released to allow the bight portion to resiliently expand to fill the pocket and provide a rigid upper perimeter frame for the pack.

According to a further feature of the invention, the bracket secured beneath the seat comprises an elongated tubular member bent into a U-form and mounted beneath the seat with the bight portion of the bracket positioned forwardly and the tubular side portions of the bracket opening rearwardly for ready receipt of the finger portions of the pack bracket.

These and other features and advantages of the invention will become apparent in the following detailed description.

BRIEF DESCRIPTION OF THE DRAWINGS

FIG. 1 is a perspective fragmentary view showing a bicycle seat with the invention seat pack assembly attached;

FIG. 2 is a plan view of the seat pack of the invention; and,

FIG. 3 is an exploded perspective view showing the manner in which the seat pack of the invention is attached to the bicycle seat.

DETAILED DESCRIPTION OF THE PREFERRED EMBODIMENT

The seat pack assembly of the invention, broadly considered, includes a pack 10, a pack bracket or frame 12, an underseat bracket 14, and a seat attachment assembly 16.

The pack 10 is formed of a suitable fabric material and includes an upper perimeter zipper 10a providing access to the central interior of the pack and a lower rear zipper 10b providing access to the lower interior of the pack. Pack 10 has a truncated triangular shape in plan view, somewhat akin to the shape of a bicycle seat, and includes a triangular fabric piece 18 overlying the top wall of the bag and circumferentially sewn along 20 and 22 to the top circumferential edge of the pack to provide a pocket 24 at the top of the pack accessible rearwardly through a relatively wide mouth opening 26 and opening forwardly at a relatively narrow opening 27. A Velcro strap 28a is stitchedly secured to the forward end of pack 10 at one side of the pack for coaction with a Velcro pile member 28b secured to the other side of the forward end of the pack.

Pack bracket or frame 12 comprises a rod or wire of resilient metallic material and of circular cross section bent into a serpentine configuration to provide, at its ends, two forwardly extending parallel prong or finger portions 12a, 12b and an intermediate bight or loop portion 12c extending outwardly and then forwardly from the rearward ends of finger portions 12a, 12b in a generally triangular configuration.

Underseat bracket 14 comprises a rigid, elongated, tubular metallic member of circular cross section formed into a U-shaped configuration to provide two rearwardly opening parallel tubular portions 14a, 14b interconnected by a bight portion 14c.

Seat attachment assembly 16 includes a metallic mounting plate 29 having apertures 29a and arcuate end portions 29b; a flat metallic mounting plate 30 having apertures 30a; a round stock bar member 32 having threaded through bores 32a; a pair of clamps 33; a pair of screw bolts 34; and a pair of screw bolts 35.

In use, pack bracket 12 is removably mounted to pack 10 by squeezing finger portions 12a, 12b together to reduce the maximum width of bight portion 12c to a dimension less than the width of pocket opening 26 and allow bight portion 12c to be forwardly inserted into opening 26 and into pocket 24 to pass the toe 12d of the bight portion through forward pocket 27, whereafter finger portions 12a, 12b may be released to allow the shoulder portions 12e of the bracket to expand outwardly and seat firmly in the shoulder portions 24a of pocket 24 to preclude separation of bracket 12 from pack 10 except by deliberate squeezing together of finger portions 12a, 12b. When thus inserted in pocket 24, bracket portion 12c outwardly fills the pocket and provides a perimeter frame for the pack to allow the pack to retain its design shape even under severe loading conditions.

Underseat bracket 14 is permanently and rigidly secured to the rearward portion of the underside of bicycle seat 36 by attachment assembly 16. Specifically, clamps 33 are positioned on seat bars 36a, 36b; bracket plate 30 is secured to the upper side of seat bars 36a, 36b by the use of bolts 33 passing through aligned holes in clamps 33 and plate 30 for coaction with suitable nuts; underseat bracket 14 is positioned beneath the rear underside of seat 36 with tubular portions 14a, 14b opening rearwardly; arcuate end portions 29b of mounting plate 29 are seated on the underside of tubular portions 14a, 14b; bar 32 is positioned over plate 30 with threaded bores 32a aligned with plate apertures 29a, 30a; and screw bolts 34 are passed upwardly and forwardly through apertures 28a, 30a for threaded engagement with threaded bores 32a, whereby to draw seat bracket 14 upwardly into clamping engagement with the underside of seat bars 36a and 36b to fixedly secure bracket 14 to the rear underside of the seat with tubular portions 14a, 14b opening rearwardly.

Pack 10 may now be readily mounted to the underside of seat 36 by positioning the forward tips of bracket finger portions 12a, 12b at the rearward openings of seat bracket tubular portions 14a, 14b and moving the pack forwardly to telescopically insert finger portions 12a, 12b into tubular portions 14a, 14b until the ends of the finger portions encounter the tubular bends at the beginnings of the bight portion 14c to define the limit of forward travel of the pack, whereafter Velcro strap 28a may be wrapped around seat post 38 and secured to Velcro pile member 28b to preclude rearward displacement of the pack relative to the seat.

The invention will be seen to provide a seat pack assembly which is simple and inexpensive and which yet provides ready and secure attachment of the pack to the seat while also providing a rigid frame structure for the pack to discourage distension or disorientation of the pack during use.

Whereas a preferred embodiment of the invention has been illustrated and described in detail, it will be apparent that various changes may be made in the preferred embodiment without departing from the scope or spirit of the invention.

I claim:

1. A removable underseat pack assembly for cycles comprising:
    A. a pack;
    B. a first mounting bracket defining one or more elongated finger portions;
    C. a second mounting bracket defining one or more elongated tubular portions having an inner diameter slightly larger than the diameter of the finger portion of the first mounting bracket for removable telescopic receipt of said finger portion;
    D. means for securing one of said mounting brackets to said pack; and
    E. clamp means for rigidly securing the other of said mounting brackets to the rear underside portion of the bicycle seat,
    whereby the pack may be mounted on the bicycle by securing the pack to said one mounting bracket, rigidly securing said other mounting bracket to the rear underside portion of the bicycle area, and telescopically inserting the elongated finger portion of the first mounting bracket into the elongated tubular portion of the second mounting bracket.

2. A removable underseat pack assembly according to claim 1 wherein:
    F. said one mounting bracket is said first mounting bracket and
    G. said other mounting bracket is said second mounting bracket.

3. A removable underseat pack assembly according to claim 1 wherein:
    F. said pack includes a pocket;
    G. said first mounting bracket is said one mounting bracket and comprises an elongated rod member configured to define two parallel elongated finger portions at its opposite ends and a bight portion interconnecting said opposite ends and shaped to be removably received in said pocket; and
    H. said second mounting bracket is said other mounting bracket and comprises an elongated U-shaped tubular member configured to define two parallel elongated tubular portions at its opposite ends separated by a distance less than the width of the bicycle seat so as to fit beneath the bicycle seat and project at their free ends rearwardly of the rear edge of the bicycle seat and a bight portion interconnecting said elongated tubular portions and adapted to fit beneath the bicycle seat forwardly of the rearwardly projecting tubular portions.

4. A removable underseat pack assembly according to claim 1 wherein:
    F. said other mounting bracket is U-shaped and is adapted to be secured to the rear underside portion of the bicycle seat with the U opening rearwardly.

5. A removable underseat pack assembly according to claim 4 wherein
    G. said other mounting bracket is said second mounting bracket and comprises an elongated tubular member defining two parallel rearwardly opening tubular portions at the opposite ends of the member.

6. A removable underseat pack assembly according to claim 1 wherein:
    F. said one mounting bracket is said first mounting bracket and comprises an elongated rod member configured to define two parallel elongated finger portions at its opposite ends and including an intermediate bight portion; and
    G. said pack includes a pocket adapted to removably receive said bight portion of said first mounting bracket.

7. A removable underseat pack assembly according to claim 6 wherein

H. said bight portion is U-shaped and extends forwardly from the rear ends of said parallel elongated finger portions; and I. said pocket opens at the rear upper edge of said pack so that said bight portion may be inserted forwardly into said pocket to dispose said elongated finger portions immediately above said pack for coaction with said other mounting bracket.

8. A removable underseat pack assembly for a cycle comprising:

A. a pack of fabric material including means defining a pocket at the top of said pack having an opening at the rear of the pack of a width less than the maximum width of the pocket; and B. an elongated rod member of resilient material serpentinely configured to define
   (1) a pair of parallel elongated forwardly extending finger portions at its opposite ends and
   (2) an intermediate bight portion extending outwardly from the rearward ends of said finger portions and then forwardly to form a pack frame having a maximum width approximating that of said pocket and greater than that of said pocket opening whereby said finger portions may be grasped and squeezed together to reduce the maximum diameter of said bight portion and allow said bight portion to be inserted into said pocket through said pocket opening, whereafter said finger portions may be released to allow said bight portion to expand and fill said pocket to provide an upper perimeter frame for said pack while said finger portions extend forwardly above said pack, outside of said pocket, for coaction with suitable bracket means on the cycle seat.

9. A removable under seat pack assembly according to claim 8 wherein

C. said pack has a generally triangular configuration in plan view with a forward apex; and D. said bight portion has a triangular configuration generally matching that of said pack so that said bight portion, once inserted into said pocket and allowed to expand to its relaxed configuration, closely borders the top circumferential edge of said pack.

10. A removable underseat pack assembly according to claim 9 wherein

E. said suitable bracket means on said cycle seat comprises an elongated U-shaped tubular member defining two parallel rearwardly opening tubular portions for telescopic receipt of said finger portions of said rod member.

11. A removable underseat pack assembly according to claim 10 wherein:

F. said pack further includes a Velcro strap secured to one side of the forward end of said pack and adapted, with the pack mounted beneath the cycle seat, to be wrapped around the seat post and secured to a Velcro pile member secured to the other side of the forward end of said pack.

* * * * *